(12) United States Patent
Kluge (10) Patent No.: US 7,946,355 B1
(45) Date of Patent: May 24, 2011

(54) AUGER ASSEMBLY

(76) Inventor: Douglas J. Kluge, Clearwater, MN (US)

( * ) Notice: Subject to any disclaimer, the term of this patent is extended or adjusted under 35 U.S.C. 154(b) by 259 days.

(21) Appl. No.: 12/008,113

(22) Filed: Jan. 8, 2008

Related U.S. Application Data (60) Provisional application No. 60/879,299, filed on Jan. 8, 2007.

(51) Int. Cl.
*F25C 5/04* (2006.01)
*E21B 10/44* (2006.01)

(52) U.S. Cl. ............................ 175/18; 175/323; 175/394

(58) Field of Classification Search .................... 175/18, 175/323; 464/182; 403/310, 312, 364; 285/144.1
See application file for complete search history.

(56) References Cited

U.S. PATENT DOCUMENTS

| | | | | |
|---|---|---|---|---|
| 137,744 A | * | 4/1873 | West | 175/323 |
| 732,479 A | * | 6/1903 | Wheeler et al. | 175/202 |
| 2,221,680 A | * | 11/1940 | Parrish | 175/394 |
| 2,260,811 A | * | 10/1941 | Kozak | 403/19 |
| 2,729,067 A | * | 1/1956 | Patterson | 405/236 |
| 2,846,192 A | * | 8/1958 | Ostling | 175/18 |
| 3,075,369 A | * | 1/1963 | Swire | 464/182 |
| 3,175,630 A | * | 3/1965 | Hein et al. | 175/386 |
| 3,710,877 A | * | 1/1973 | Michasiw | 175/18 |
| 3,929,196 A | * | 12/1975 | Rantanen | 175/18 |
| 4,821,818 A | * | 4/1989 | Mefferd | 175/323 |
| 5,269,572 A | * | 12/1993 | Mefferd | 285/330 |
| 5,372,208 A | * | 12/1994 | Mefferd | 175/314 |
| 5,782,310 A | * | 7/1998 | Lange | 175/323 |
| 5,950,744 A | * | 9/1999 | Hughes | 175/320 |
| 6,502,649 B1 | | 1/2003 | Havel | |
| 6,679,559 B2 | * | 1/2004 | Kelm | 299/57 |
| 6,681,871 B2 | * | 1/2004 | Drumm et al. | 175/19 |
| 7,037,045 B2 | * | 5/2006 | Jones | 405/252.1 |
| 7,090,437 B2 | * | 8/2006 | Pinkleton | 405/244 |
| 7,192,094 B2 | * | 3/2007 | Kelm | 299/56 |
| 7,506,697 B2 | * | 3/2009 | Pflieger | 175/57 |
| 2003/0186751 A1 | * | 10/2003 | Koskela et al. | 464/182 |
| 2004/0028481 A1 | * | 2/2004 | Pinkleton | 405/259.1 |
| 2007/0107936 A1 | * | 5/2007 | Pflieger | 175/18 |

* cited by examiner

*Primary Examiner* — Jennifer H Gay
(74) *Attorney, Agent, or Firm* — Richard John Bartz (57) ABSTRACT

An auger assembly has a shaft supporting flight units having lug and recess connections allowing broken flight units to be removed from the shaft and replaced with another flight unit. The auger assembly is incorporated in an ice drill having a cordless electric motor and a cutting head. A coupling locks the auger assembly on the motor drive shaft.

21 Claims, 8 Drawing Sheets

AUGER ASSEMBLY

CROSS REFERENCE TO RELATED APPLICATION

This application is a continuation of and claims the priority of U.S. Provisional Application Ser. No. 60/879,299 filed Jan. 8, 2007.

FIELD OF THE INVENTION

The invention relates to rotatable auger assemblies used to move fluid-like materials to selected locations.

BACKGROUND OF THE INVENTION

Auger assemblies are used to transport and convey fluid-like materials, including but not limited to particulate materials, grains, fibers, water, snow and ice particles to desired locations. Conventional auger assemblies have elongated linear shafts with continuous helical flights fixed to the shafts. Power transmissions and motors connected to the shafts operate to rotate the auger assemblies to move the materials along the helical flights. Augers with cutting heads used with hand cranks and internal combustion motors to drill holes in ice on lakes and rivers for ice fishing. These augers have metal construction with high cutting torque that withstands environmental and operator abuse. Metal augers driven with internal combustion engines are bulky, heavy and environmentally detrimental. Weight reduction of auger assemblies and ice drills have been achieved with plastic tubes connected to plastic continuous helical flights located around metal shafts. The tubes with helical flights are not removable from the shafts to allow a person to repair broken augers and helical flights by replacing the broker augers and related parts.

SUMMARY OF THE INVENTION

The auger assembly of the invention has a plurality of flight units supported on a shaft adapted to be rotated whereby fluid-like materials are moved by the flight units to selected locations. Adjacent flight units have cooperating members, such as lugs and recesses, drivably connecting the flight units. The flight units are separately removed whereby broken flight units can be removed and replaced with new flight units. The flight units have helical-shaped flights located in staggering relationship or linear relationship along the length of the shaft whereby the flights when rotated efficiently move the fluid-like materials.

The auger assembly in one embodiment is connected to a cutting head and a motor or a crank arm useable to drill a hole in ice on a body of water. Flight units of the auger assembly are individually removable and replaced with new flight units to repair broken flight units. The motor is a cordless electric motor connected to the auger assembly with a releasable coupling that prevents inadvertent separation of the auger assembly and cutting head from the motor. The motor has a threaded drive shaft turned into a threaded bore in a split head. A clamp around the split head locks the split head onto the threaded drive shaft. The split head has upright members separated with upright slots. The clamp surrounds the upright members and biases the upright members into tight locking engagement with the threaded drive shaft. The clamp must be released to remove the motor from the auger assembly. A body joined to the split head is coupled to the auger assembly so that the motor when operated rotates the auger assembly and cutting head. Cooperating members on the body and auger assembly drivably connect the body to an end of the auger assembly shaft. A collar around the body retains the body on the auger assembly shaft. The collar is releasable from the auger assembly shaft to allow flight units to be removed from the shaft and replaced with one or more new flight units. The drill is a durable light weight and easy to repair assembly useable with a conventional cordless electric motor to cut a hole in ice for ice fishing.

DETAILED DESCRIPTION OF THE INVENTION

In the following detailed description of the auger assembly and ice drill of the invention, reference is made to the accompanying drawing that from a part hereof, and in which are shown, by way of illustration, specific embodiments in which the invention may be practiced. It is to be understood that other embodiments may be utilized and structural changes may be made without departing from the scope of the present invention.

Figure 1:
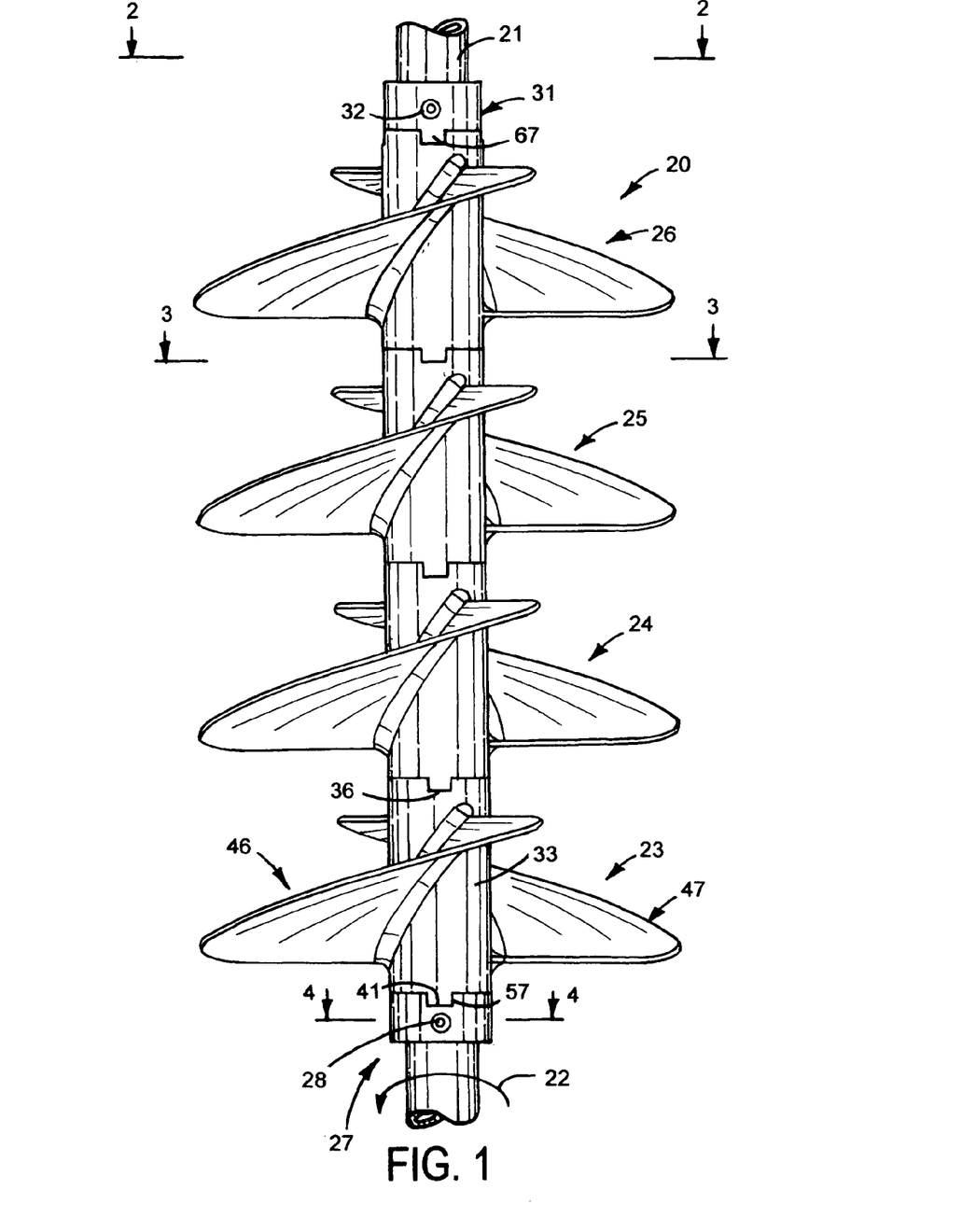
FIG. 1 is a front elevational view of the auger assembly of the invention.
Figure 2:
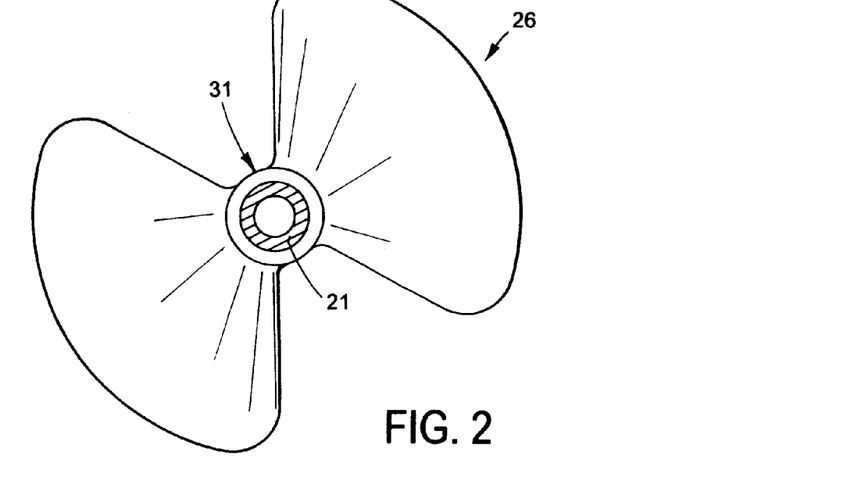
FIG. 2 is a sectional view taken along line 2-2 of FIG. 1.
Figure 3:
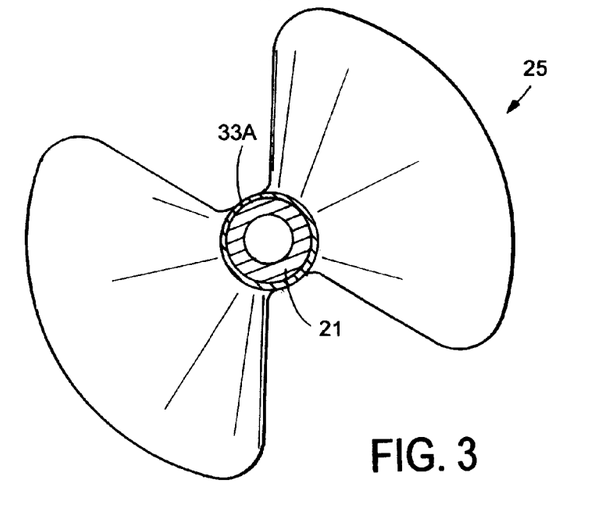
FIG. 3 is a sectional view taken along the line 3-3 of FIG. 2.
Figure 4:
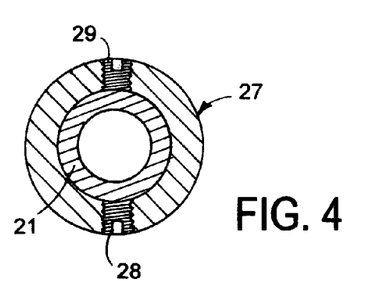
FIG. 4 is an enlarged sectional view taken along line 4-4 of FIG. 1.

One embodiment of the invention, shown in FIGS. 1 to 4, is an auger assembly 20 having a drive shaft 21 adapted to be rotated about its longitudinal axis as indicated by arrow 22. Auger assembly 20 is used in conveyors to transport particulate materials, grain, fibers, liquids, gases, snow and ice particles. Shaft 21 is a linear tubular metal member adapted to be connected to a powered device, such as a motor or power transmission apparatus. Shaft 21 can be a linear solid cylindrical member including a plastic tube. A plurality of flight units 23, 24, 25 and 26 are located end-to-end on shaft 21. A first or lower drive ring 27 secured to shaft 21 with fasteners 28 and 29, shown as set screws in FIG. 4, is drivably connected to flight unit 23. A second or upper drive ring 31 secured to shaft 21 with fasteners 32, shown as a set screw, is drivably connected to flight unit 26. Adjacent flight units 23,24; 24,25 and 25,26 have cooperating members that drivably couple the units whereby flight units 23-26 are concurrently driven with shaft 21. Drive rings 27 and 31 retain flight units 23-26 in end-to-end driving relationship and drivably couple flight units 23 and 26 to shaft 21. As shown in FIG. 1, four flight units 23-26 are mounted on shaft 21 between drive rings 27 and 31. Additional flight units or fewer flight units can be mounted on shaft 21. At least one of drive rings 27 and 31 can be removed from shaft 21 to allow a different number of flight units to be mounted on shaft 21. As shown in FIG. 4, drive ring 27 is a cylindrical body having an inside wall in surface contact with the outside wall of shaft 21. Set screws 28 and 29 threaded into opposite threaded holes in the body engage shaft 21 to retain drive ring 27 in driving engagement with shaft 21. Additional fasteners can be used to hold drive ring 27 on shaft 21. Drive ring 31 is secured to shaft 21 with fasteners 32 having the same structure as shown in FIG. 4.

Figure 9:
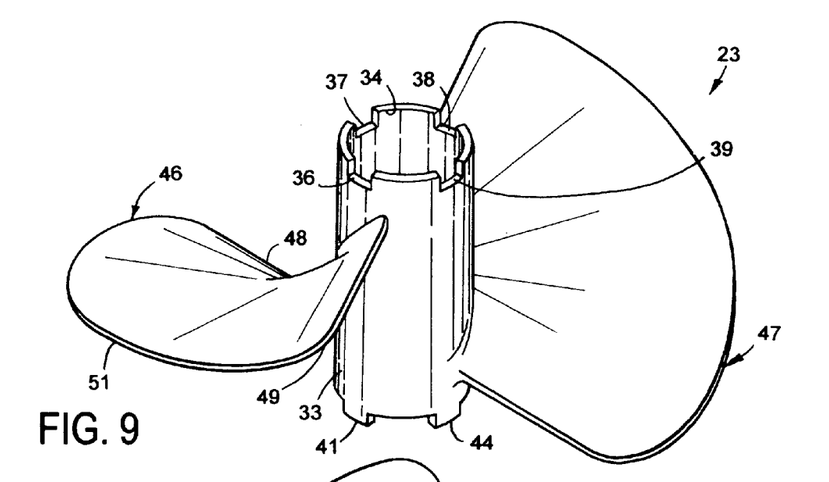
FIG. 9 is a perspective view of a flight unit of the auger assembly of FIG. 1.
Figure 10:
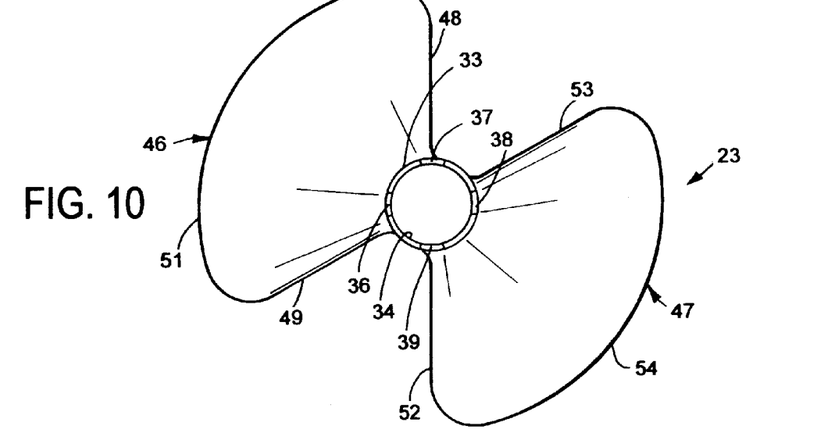
FIG. 10 is a top plan view of FIG. 9.
Figure 11:
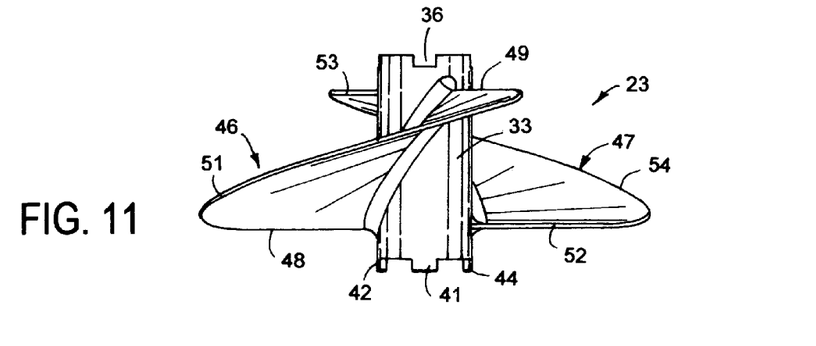
FIG. 11 is a side elevational view of FIG. 9.

Flight unit 23, shown in FIGS. 9-11, has a sleeve or tubular cylindrical member 33 having a continuous inside cylindrical wall 34 around a cylindrical passage that accommodates shaft 21. The upper end of member 33 has circumferentially spaced recesses 36, 37, 38 and 39 providing inwardly directed arcuate and rectangular shaped pockets. Upright arcuate end sections of member 33 are located between adjacent recesses 36-39. The lower end of member 33 has downwardly extended lugs or projections 41, 42 and 44. Projections 41, 42 and 44 have arcuate shapes and sizes that correspond to the arcuate shapes and sizes of recesses 36-39 whereby projections 41, 42 and 44 fit into recesses of adjacent flight units. A pair of helically curved flights or vanes 46 and 47 are joined to member 33 and extend outwardly from opposite sides of member 33. Flight 46 has a radial leading edge 48, a radial trailing edge 49 and an outer convex curved peripheral edge 51 extended between edges 48 and 49. Edge 51 has an arcuate extent of about 90 degrees. Flight 47 has a radial leading edge 52, a radial trailing edge 53, and an outer convex curved peripheral edge 54. Edge 54 has an arcuate extent of about 90 degrees. Member 33 and flights 46 and 47 is a one-piece plastic or composite resin member. Other materials including metal can be used for the flight units. The radial length of flights 46 and 47 and axial length of member 33 can vary to provide auger assemblies having different sizes and lengths. Flight units 24-26 have the same structures and sizes as flight unit 23. As shown in FIG. 3, sleeve 33A surrounds shaft 21 to mount flight unit 25 on shaft 21.

Figure 5:
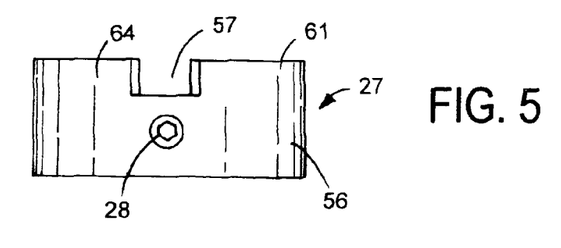
FIG. 5 is an enlarged front elevational view of the lower flight unit drive ring of the auger assembly of FIG. 1.
Figure 6:
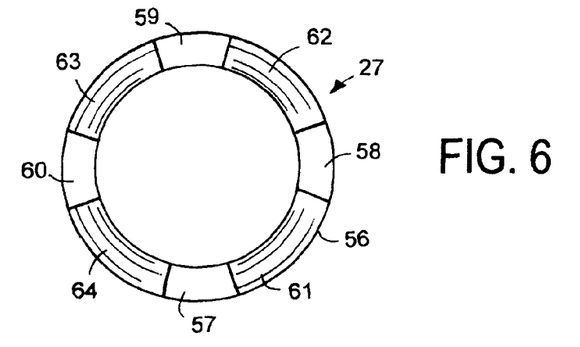
FIG. 6 is a top plan view of FIG. 5.
Figure 7:
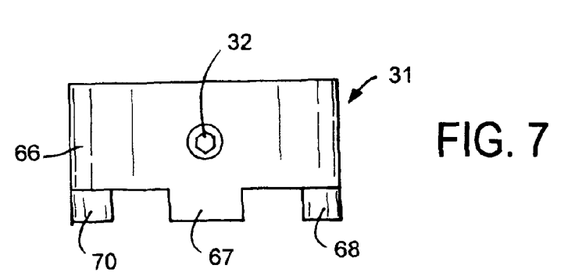
FIG. 7 is an enlarged front elevational view of the upper flight unit drive ring of the auger assembly of FIG. 1.
Figure 8:
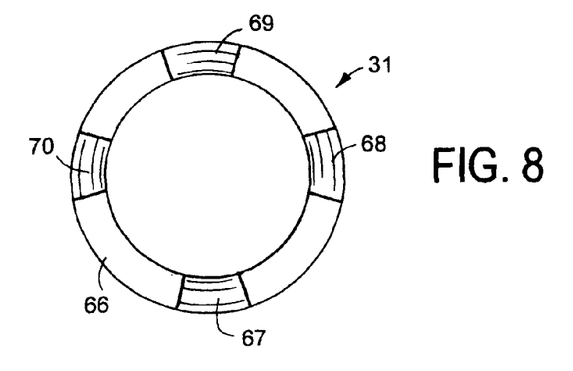
FIG. 8 is a bottom plan view of FIG. 7.

Drive ring 27, shown in FIGS. 5 and 6, has a cylindrical tubular body 56 with four arcuate shaped recesses 57, 58, 59 and 60 in the upper portion thereof. Adjacent recesses 57-60 are circumferentially separated about 90 degrees from each other with arcuate shaped segments 61, 62, 63 and 64. Body 56 can have one or more recesses. Drive ring 31, shown in FIGS. 7 and 8, has a cylindrical tubular body 66 with four downwardly extended arcuate shaped lugs or teeth 67, 68, 69 and 70. Adjacent lugs 67-70 are circumferentially spaced about 90 degrees from each other. The number and spaces between adjacent lugs can vary from one or more lugs. As shown in FIG. 1, lug 41 on sleeve 33 extends into recess 57 in ring member 27. The remaining lugs on member 33 also extend into recesses in ring member 27 to drivably couple flight unit 23 to drive ring 27.

Flight 23, shown in FIG. 1, has flights 46 and 47 vertically aligned with the flights of flight units 24-26. Adjacent flight units can be staggered or circumferentially indexed 90 degrees to locate adjacent flights 90 degrees from each other.

Ice fishing in winter is a popular outdoor activity in North United States and Canada. Walking onto a frozen lake, drilling holes in the ice, and sitting on a bucket with a jig stick in hand in temperatures below zero is ice fishing, a therapeutic experience. Out on the ice the hassles of work, the to-do lists, taxes, wars and politicians all fade away into the background. A field of ice is a landscape that sears the sin from the soul. Ice drills are used to cut one or more holes in ice on frozen bodies of water. Manual crank drills and motor driven drills operate to cut holes in the ice which can have a thickness of 6 to 30 or more inches.

Figure 12:
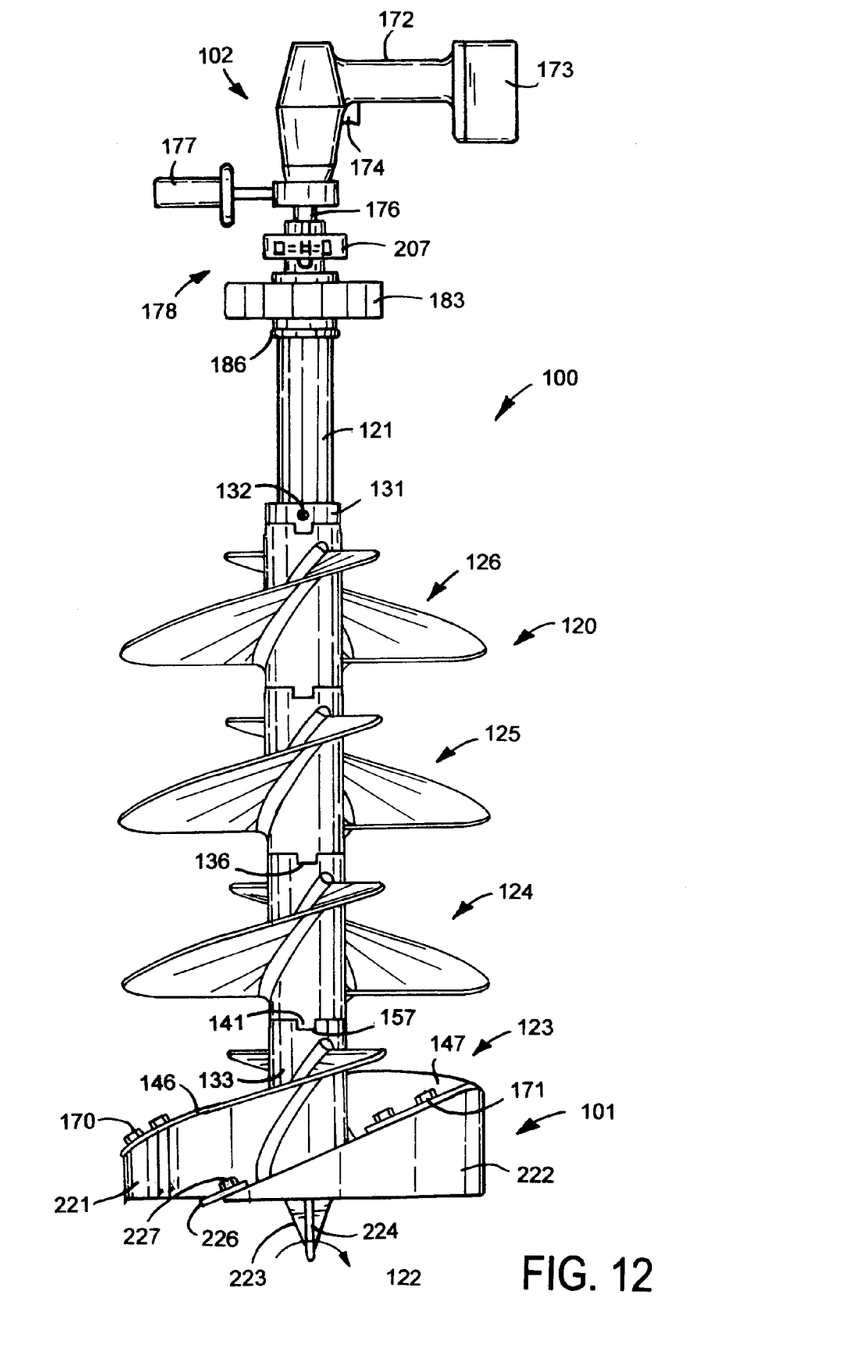
FIG. 12 is a front elevational view of an ice drill having the auger assembly of FIG. 1.
Figure 13:
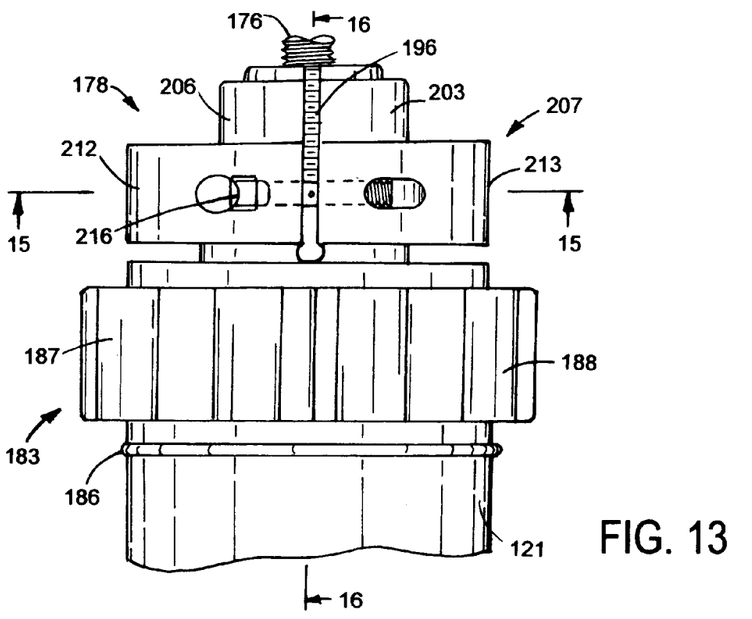
FIG. 13 is an enlarged front elevational view of the coupling of the auger assembly.
Figure 14:
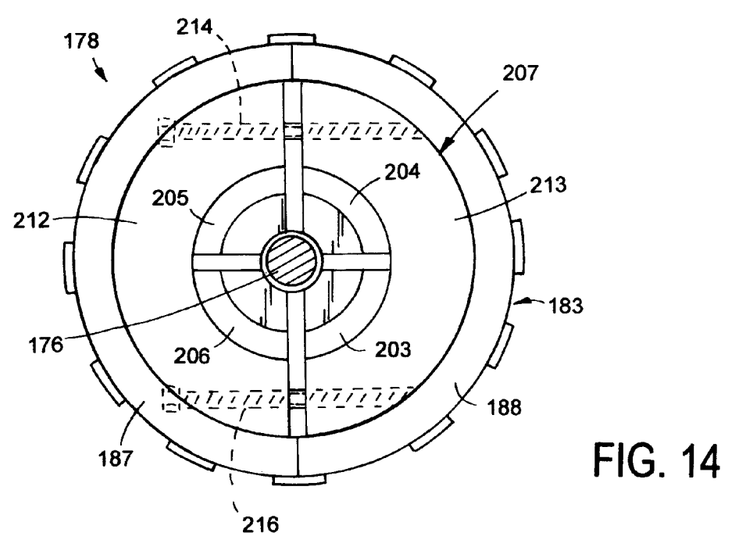
FIG. 14 is a top plan view of FIG. 13.

As shown in FIG. 12, an ice drill indicated generally at 100, has an auger assembly 120 connected to a cutting head 101. A motor 102, shown as an electric motor, coupled to auger assembly 120 is used to rotate auger assembly 120 and cutting head 101 to drill a hole in ice. Auger assembly 120 has the same parts as auger assembly 20 with corresponding parts having the same reference member with a prefix 1. Auger assembly 120 has a drive ring 131 secured to shaft 121 with fastener 132. A plurality of flights 124, 125 and 126 are mounted on shaft 121. Flight 123 has a sleeve or tubular cylindrical member 133 accommodating shaft 121. The upper end of member 133 has a U-shaped recess 157. Flight 124 has a downwardly directed lug or projection 141 that fits into recess 157 to connect flight 124 to flight 123. The upper end of flight 124 has a U-shaped recess 136 accommodating a lug on flight 125. A pair of helically curved flights or vanes 146 and 147 joined to member 133 extend outwardly from opposite sides of member 133. Bolts 170 and 171 secure cutting head 101 to vanes 146 and 147.

As shown in FIG. 12, motor 102 is a d.c. electric motor with a lateral arm 172 supporting a battery 173. Battery 173 can be a 36 volt lithium ion battery pack. A trigger 174 on arm 172 is manually operated to control the speed of motor 102. Motor 102 has downwardly extended driven threaded shaft 176 normally attached to a conventional chuck for holding a tool. The chuck has been removed from shaft 176. A lateral handle 177 attached to the lower side of motor 102 is used by the operator in conjunction with arm 172 to retain ice drill 100 in an upright position during drilling a hole in the ice. Motor 102 and battery 173 is a conventional cordless power tool that can be removed from auger assembly 120 and used with a chuck holding conventional cutting and grinding tools.

A releasable coupling 178 connects driven shaft 176 to auger assembly 121. Coupling 178 is locked onto shaft 176 to prevent auger assembly 120 and cutting head 101 from falling through the ice hole to the bottom of the body of water.

Figure 16:
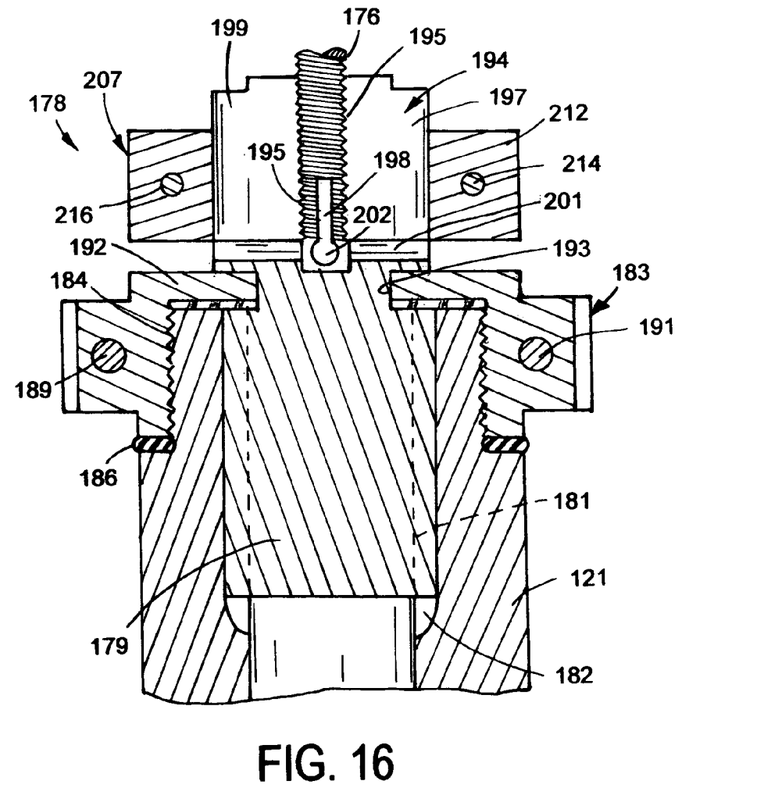
FIG. 16 is a sectional view taken along line 16-16 of FIG. 13.

Coupling 178, shown in FIG. 16, has a body 179 extended into the upper end of shaft 121. Body 179 and shaft 121 have cooperating splines and grooves 181 and 182 that drivably connect body 179 to shaft 121. An annular collar 183 having internal threads 184 is threaded onto the upper outer end of shaft 121. The lower annular section of collar 183 frictionally engages an elastic ring 186 to prevent collar 183 from working off of ring 186. Collar 183 has two C-shaped members 187 and 188 retained around shaft 121 with bolts 189 and 191. Collar 183 has an inwardly directed flange 192 extended into an annular groove 193 above body 179 to axially hold collar 183 on body 179 and allow collar 183 to rotate relative to body 179.

Figure 15:
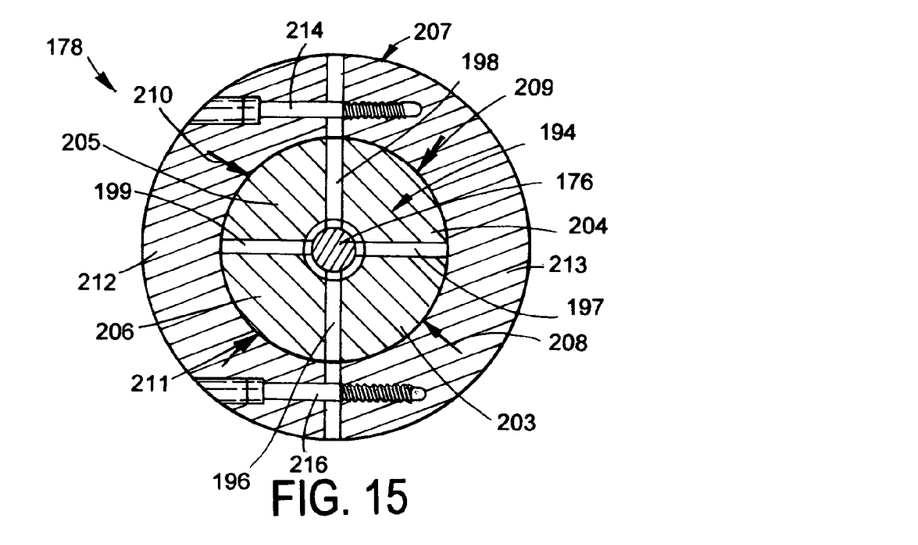
FIG. 15 is a sectional view taken along line 15-15 of FIG. 13.

A split head 194 with an axially threaded hole 195 is joined to the top of body 179. Head 194 has four radial slots 196, 197, 198 and 199 extended longitudinally into head 194 to cross bores 201 and 202. The diameters of bores 201 and 202 are greater than the widths of slots 196-199 to reduce stress edges at the bottoms of slots 196-199. Slots 196-199 divide head 194 into four upright fingers or members 203, 204, 205 and 206 having threads that engage the threads of motor shaft 176. Head 194 can have radial slots dividing the head into two or three fingers. Fingers 203-206 are quarter segments of a cylinder with inner small arcuate sections engaging motor shaft 176. A clamp 207 surrounding split head 194 applies inward radial forces on fingers 203-206, shown by arrows 208, 209, 210 and 211 in FIG. 15, to lock fingers 203-206 on motor shaft 176. Clamp 207 prevents separation of auger assembly 120 and cutting head 101 from motor 102. Clamp 207 has first and second C-shaped members 212 and 213 located around split head 194. A pair of bolts 214 and 216 associated with members 212 and 213 apply clamping forces on members 212 and 213 which lock fingers 203-206 on motor shaft 176.

Figure 17:
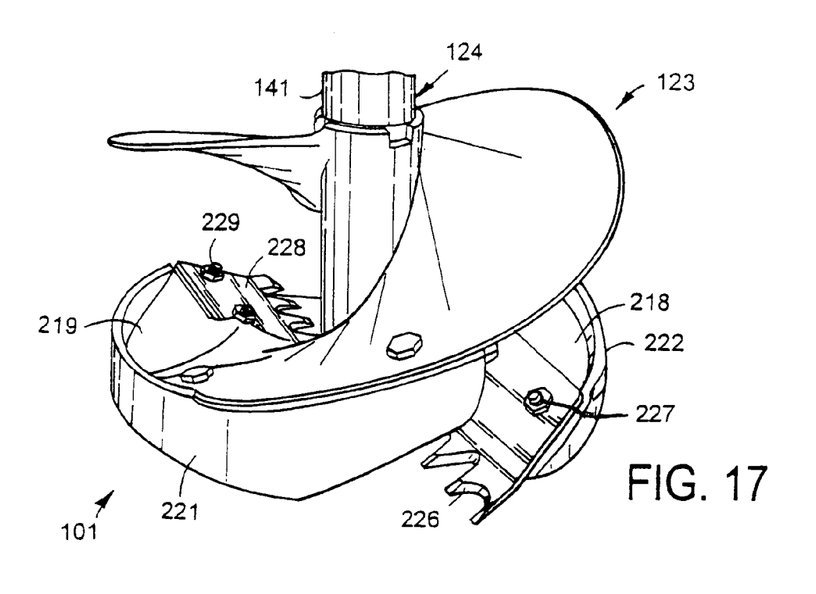
FIG. 17 is a perspective view of the cutting head of the ice drive of FIG. 12.
Figure 18:
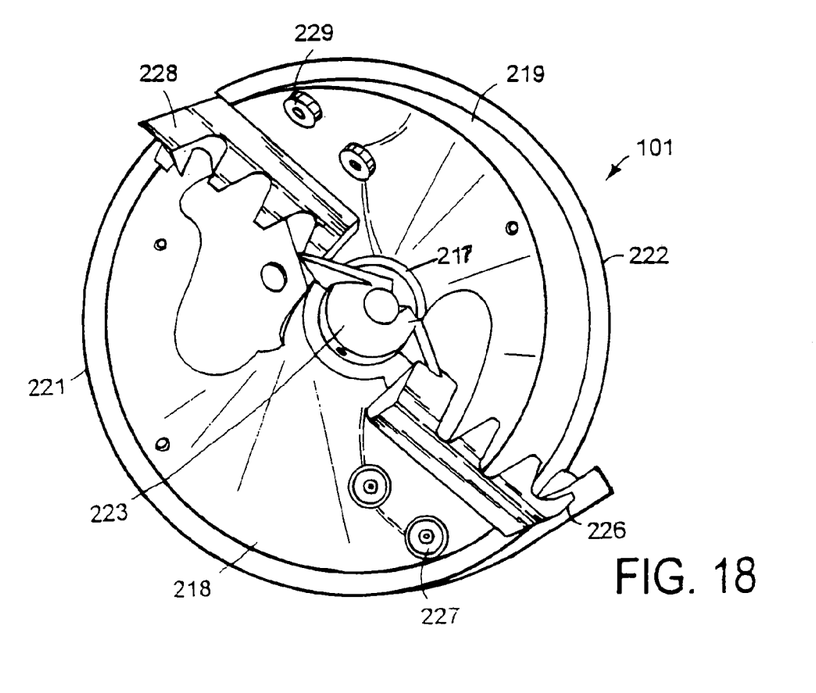
FIG. 18 is a bottom plan view of FIG. 17.

Cutting head 101, shown in FIGS. 12, 17 and 18, has a cylindrical center boss 217 joined to space base sections 218 and 219 having upwardly inclined arcuate side walls 221 and 222. A center cone 223 having a cutting blade 226 is joined to the bottom of boss 217. A pair of knives 226 and 228 are secured to base sections 218 and 219 with bolts 227 and 229. Blade 229 when rotated cuts a pilot hole in the ice that guides cutting head 101 vertically down into the ice. Knives 226 and 228 are inclined upwardly and rearwardly so as to cut ice and lift ice particles into the path of flight unit 123.

The flights of flight units 123-126 in FIG. 12 are vertically aligned. Adjacent flight units can be staggered or circumferentially indexed 90 degrees to locate adjacent flights in separate circumferential locations. The flight units have lug and recess connections allowing the flight units to be stacked on the drive shaft of the ice drill in aligned or staggered relationship. The lug and recess connections transmit torque between the flight units and allow removal and replacement of a damaged or broken flight unit.

The advantages and details of structures and functions of the preferred embodiments have been disclosed. They are exemplary and other equivalents are feasible. Therefore, changes in shape, size, elements and arrangement of the auger and ice drill can be made by a person skilled in the art within the scope of the invention.

The invention claimed is:

1. An auger assembly comprising:
a shaft;
a first flight unit mounted on the shaft;
a second flight unit mounted on the shaft;
the first flight unit having a first sleeve located around the shaft;
said first sleeve having opposite sides and a plurality of circumferentially spaced recesses in one end thereof, and a plurality of circumferentially spaced projections in the end opposite the one end of the first sleeve;
a second flight unit having a second sleeve located around the shaft;
said second sleeve having opposite sides and a plurality of circumferentially spaced recesses in one end thereof, said circumferentially spaced projections of the first sleeve extended into the circumferentially spaced recesses of the second sleeve to drivably connect the first sleeve to the second sleeve;
a pair of helically curved flights secured to the opposite sides of the first and second sleeves, each of said flights having a first radial outwardly extended end located below the upper end of each sleeve and a second radial outwardly extended end located above the lower end of each sleeve, said second radial outwardly extended end being circumferentially spaced from the first radial outwardly end, said helically curved flights secured to the first and second sleeves being axially spaced from each other;
a first member connected to the first flight unit, said member including projections extended into the recesses in one end of the first sleeve to drivably connect the first member to the first sleeve;
a first fastener securing the first member to the shaft whereby on rotation of the shaft the first and second flight units are rotated with the shaft;
a second member operatively connected to the second flight unit; and
a second fastener securing the second member to the shaft, said first and second members drivably connecting the first and second flight units to the shaft.

2. The auger assembly of claim 1 wherein:
the first end of said flights has a radial outwardly extended leading edge and the second end of said flights having a radial outwardly extended trailing edge.

3. The auger assembly of claim 1 wherein:
the first member comprises a first cylindrical member surrounding the shaft.

4. A flight unit for an auger assembly comprising:
a cylindrical sleeve having opposite sides, a first end and a second end;
a pair of helical shaped flights joined to the opposite sides of the sleeve;
each of said flights having one end located below the first end of the sleeve and a second end located above the second end of the sleeve;
said pair of helical shaped flights comprising
a first helical flight secured to one side of the sleeve;
a second helical flight secured to the side of the sleeve opposite the one side of the sleeve;
said first and second flights having a first radial outwardly extended end located below the first end of the sleeve and a second radial outwardly extended end located above the second end of the sleeve;
the one end of each of said flights having a radial outwardly extended leading edge located above the second of the end of the sleeve, and a second end of each of said flights having a radial extending trailing edge located below the first end of the sleeve, said leading edge and trailing edge being circumferentially spaced from each other;
a plurality of circumferentially spaced projections on the first end of the sleeve; and
a plurality of circumferentially spaced recesses in the second end of the sleeve.

5. The flight unit of claim 4 wherein:
each of said projections has an arcuate shape; and
each of said recesses has an arcuate shape that is substantially the same as the arcuate shape of the projection.

6. A drill for cutting a hole in ice on a body of water comprising:
a motor including a threaded drive shaft;
an auger assembly operatively connected to the motor whereby the motor operates to rotate the auger assembly;
a cutting head secured to the auger assembly for cutting a hole in ice;
said auger assembly including
a shaft connected to the motor;
a first flight unit mounted on the shaft;
fasteners securing the first flight unit to the cutting head;
a second flight unit mounted on the shaft;
said first and second flight units having cooperating members drivably connecting said first and second flight units;
a ring operatively connected to the second flight unit;

at least one fastener securing the ring to the shaft whereby the ring and cutting head drivably connect the first and second flight units to the shaft;

a releasable coupling connecting the drive shaft of the auger assembly shaft;

said coupling having a split head with an axially threaded hole accommodating the threaded drive shaft of the motor;

a clamp surrounding the split head operable to compress and lock the split head on the drive shaft of the motor;

a body joined to the split head;

members on the body and auger assembly shaft to drivably connect the body to the auger shaft assembly; and a collar retaining the body on the auger assembly shaft.

7. The drill of claim 6 wherein:
the first and second flight units each include a sleeve located around the shaft; and
a pair of helical shaped flights secured to the sleeve.

8. The drill of claim 6 wherein: the cooperating members comprise
at least one recess in the first flight unit; and
at least one projection on the second flight unit extended into the recess to drivably connect the first flight unit to the second flight unit.

9. The drill of claim 6 wherein:
the first flight unit has a first sleeve located around the shaft;
said first sleeve having a plurality of circumferentially spaced recesses in one end thereof;
the second flight unit has a second sleeve located around the shaft;
said second sleeve having a plurality of circumferentially spaced projections in one end thereof extended into the recesses in the first sleeve to drivably connect the first sleeve to the second sleeve; and
at least one helical shaped flight secured to each first and second sleeves.

10. The drill of claim 9 including: members connecting the ring to the second sleeve.

11. The drill of claim 9 wherein: a pair of helical shaped flights are secured to each first and second sleeves.

12. The drill of claim 6 wherein:
the first and second flight units each include a sleeve having an upper end and a lower end mounted on the shaft;
a first helically curved flight joined to one side of the sleeve and extended outwardly from the sleeve;
a second helically curved flight joined to the side opposite the one side of the sleeve and extended outwardly from the sleeve;
said first and second helically curved flights being located below the upper end of the sleeve and above the lower end of the sleeve whereby the first and second helically curved flights on adjacent sleeves are spaced from the first and second helically curved flights on the sleeve.

13. The drill of claim 12 wherein:
the cooperating members comprise
a plurality of circumferentially spaced recesses in the upper end of the sleeve; and
a plurality of circumferentially spaced projections extended downwardly from the lower end of the sleeve having shapes to fit into recesses in the upper end of an adjacent sleeve thereby drivably connecting the first flight unit to the second flight unit.

14. The drill of claim 12 wherein:
the first and second helically curved flights each have a radial outwardly extended leading edge and a radial outwardly extended trailing edge circumferentially spaced from said leading edge.

15. The drill of claim 6 wherein:
the members comprise spline and groove members.

16. A drill for cutting a hole in ice on a body of water comprising:
a motor including a threaded drive shaft;
an auger assembly operatively connected to the motor whereby the motor operates to rotate the auger assembly;
a cutting head secured to the auger assembly for cutting a hole in ice;
said auger assembly including
a shaft connected to the motor;
a first flight unit mounted on the shaft;
fasteners securing the first flight unit to the cutting head;
a second flight unit mounted on the shaft;
said first and second flight units having cooperating members drivably connecting said first and second units;
a ring operatively connected to the second flight unit;
at least one fastener securing the ring to the shaft whereby the ring and cutting head drivably connect the first and second flight units to the shaft;
a releasable coupling connecting the drive shaft to the auger assembly shaft;
said coupling having a split head with an axially threaded hole accommodating the threaded drive shaft of the motor;
a clamp surrounding the split head operable to compress and lock the split head on the drive shaft;
said split head including a plurality of upright members and upright slots separating adjacent upright members;
said clamp surrounding the upright members and biasing the upright members into tight engagement with the drive shaft of the motor;
said clamp comprising first and second C-shaped members located around the upright members; and
fasteners connecting the first and second C-shaped members to apply clamping forces on the upright members to compress and lock the upright members on the drive shaft of the motor.

17. The drill of claim 16 wherein:
the first and second flight units each include a sleeve having an upper end and a lower end mounted on the shaft;
a first helically curved flight joined to one side of the sleeve and extended outwardly from the sleeve;
a second helically curved flight joined to the side opposite the one side of the sleeve and extended outwardly from the sleeve;
said first and second helically curved flights being located below the upper end of the sleeve and above the lower end of the sleeve whereby the first and second helically curved flights on adjacent sleeves are spaced from the first and second helically curved flights on the sleeve.

18. The drill of claim 17 wherein:
the cooperating members comprise
a plurality of circumferentially spaced recesses in the upper end of the sleeve; and
a plurality of circumferentially spaced projections extended downwardly from the lower end of the sleeve having shapes to fit into recesses in the upper end of an adjacent sleeve thereby drivably connecting the first flight unit to the second flight unit.

19. The drill of claim 17 wherein:
the first and second helically curved flights each have a radial outwardly extending leading edge and a radial outwardly extended trailing edge circumferentially spaced from said leading edge.

20. A drill for cutting a hole in ice on a body of water comprising:
a motor;
an auger assembly drivably connected to the motor whereby the motor operates to rotate the auger assembly;
a cutting head secured to the auger assembly operable upon rotation thereof for cutting a hole in ice on a body of water;
said auger assembly including
a shaft connected to the motor whereby the motor rotates the shaft;
a first flight unit having a first sleeve located around the shaft, said first sleeve having opposite sides, an upper end and a lower end;
first and second helically curved flights secured to the opposite sides of the first sleeve, said first and second helically curved flights having trailing radial edges located below the upper end of the first sleeve and leading radial edges above the lower end of the first sleeve;
a second flight unit having a second sleeve located around the shaft, said second sleeve having opposite sides, an upper end and a lower end;
first and second helically curved flights secured to the second sleeve and having trailing radial ends located below the upper end of the second sleeve and leading radial ends above the lower end of the second sleeve;
said helically curved flights secured to the first and second sleeves being axially spaced from each other;
a plurality of circumferentially spaced recesses in the upper end of the first sleeve, a plurality of circumferentially spaced projections extended downwardly from the lower end of the first sleeve, a plurality of spaced recesses in the upper end of the second sleeve;
a collar surrounding the shaft having projections located in the recesses in the upper end of the first sleeve to drivably connect the first sleeve to the shaft; and
at least one fastener securing the collar to the shaft whereby on operation of the motor the shaft, first and second helical flight units and cutting head are rotated.

21. The drill of claim 20 wherein:
the radial outwardly extended trailing edge is circumferentially spaced from said leading edge of each of the first and second helically curved flights.

* * * * *